United States Patent [19]

Carnahan et al.

[11] 3,947,846

[45] Mar. 30, 1976

[54] THYRATRON LIMITER RADAR ANTI-JAMMING CIRCUIT

[75] Inventors: Samuel U. Carnahan, Chadd's Ford, Pa.; James G. Holman, Baltimore, Md.

[73] Assignee: The United States of America as represented by the Secretary of the Navy, Washington, D.C.

[22] Filed: May 29, 1962

[21] Appl. No.: 199,569

[52] U.S. Cl. ............................... 343/18 E; 328/171
[51] Int. Cl.² ........................ G01S 7/36; H03B 3/02
[58] Field of Search ........... 328/169, 171; 325/420; 324/411, 414; 343/18 E

[56] References Cited
UNITED STATES PATENTS 3,233,191  2/1966  Brian ............................. 328/171 X

*Primary Examiner*—Malcolm F. Hubler
*Attorney, Agent, or Firm*—R. S. Sciascia; Paul S. Collignon

EXEMPLARY CLAIM

1. A limiter circuit for limiting the voltage amplitude of a circuit comprising:
   a circuit to be limited with respect to a fixed potential thereof;
   an electron emission device having a control electrode and two conductiton electrodes, one of said conduction electrodes being coupled to said circuit to be limited and the other of said conduction electrodes being coupled to said fixed potential;
   a Zener diode having its anode connected to said other conduction electrode of said electron emission device and its cathode coupled to said fixed potential; and
   a voltage biasing source from said fixed potential connected to said control electrode of said electron emission device to establish a voltage amplitude limit for said circuit to be limited.

6 Claims, 4 Drawing Figures

INVENTOR.
Samuel U. Carnahan,
BY James G. Holman
N. H. Loucks
Att'ys.

THYRATRON LIMITER RADAR ANTI-JAMMING CIRCUIT

This invention relates to anti-jamming circuits for angle tracking radar systems and more particularly to a thyratron limiter for eliminating countermeasure jamming signals of enemy inverse gain jammer radars in the detector circuits of own angle tracking radar.

Radar systems using the conical scanning or lobing principle of angle tracking are susceptible to inverse gain jammers of target objects carrying countermeasure radar systems. A conical lobe angle tracking radar depends for its operation on the principle that, as the antenna beam is nutated or lobed, any target not lying directly on the nutation or lobe axis will produce a target return signal which is amplitude modulated at the lobing frequency. The amplitude of the modulation is a function of the distance of the target off the nutation axis, and the phase angle is a function of the direction of the target off the nutation axis. This signal modulation is used by the angle tracking radar to control the antenna tracking servo system of own radar to track the target.

The inverse gain jammer radar, expected to be carried by enemy radar, receives the pulsed radio frequency (RF) signal from the tracking radar, amplifies it, and retransmits this signal back to the angle tracking radar. The inverse gain jammer radar, upon receiving the amplitude modulated RF signals, shifts them in phase of 180° and uses them to modulate the output of the inverse gain jammer to transmit back jamming signals to own angle tracking radar. This causes own angle tracking radar tracking loop to be driven in the wrong direction by the error signals and results in own angle tracking radar unlocking from the target or of the antenna circling the actual target bearing.

In the present invention own radar angle tracking system includes a thyratron limiter circuit coupled to the output of a boxcar detector or demodulator in own radar tracking circuits so that jamming signals will become clipped and ineffective to drive the angle tracking radar in an erroneous manner for loss of target tracking. In this invention the range gating signals, which are in synchronism with the pulsed RF signals, produce a detected boxcar envelope of the amplitude modulation echo signals of the target providing error signals which are conducted through a cathode follower to the angle tracking radar circuits. Whenever jamming signals are detected in the boxcar detector or modulator, the amplitude of the jamming signals will greatly exceed the amplitude of the normal modulated echo error signals and the thyratron limiter will clip these high amplitude jamming signals to render them ineffective in the detector circuit of the angle tracking radar system. Since the jamming signals are of high amplitude over 180° of each amplitude modulated echo error signal cycle for the purpose of gate stealing in own angle tracking radar, the limiting or clipping of these jam signals will not entirely render the angle tracking radar system ineffective since tracking can still be obtained for the remaining 180° of each amplitude modulated error signal cycle. Accordingly, it is a general object of this invention to provide a voltage amplitude limiting circuit for limiting the amplitude of jamming echo error amplitude modulated RF signals of a conical scanning radar system to render ineffective the jamming effects and range gate stealing of these amplitude jamming signals.

These and other objects and the attendant advantages, features, and uses of the invention may become more apparent to those skilled in the art of radar countermeasures and anti-jamming when considered along with the accompanying drawing, in which.

Figure 1:
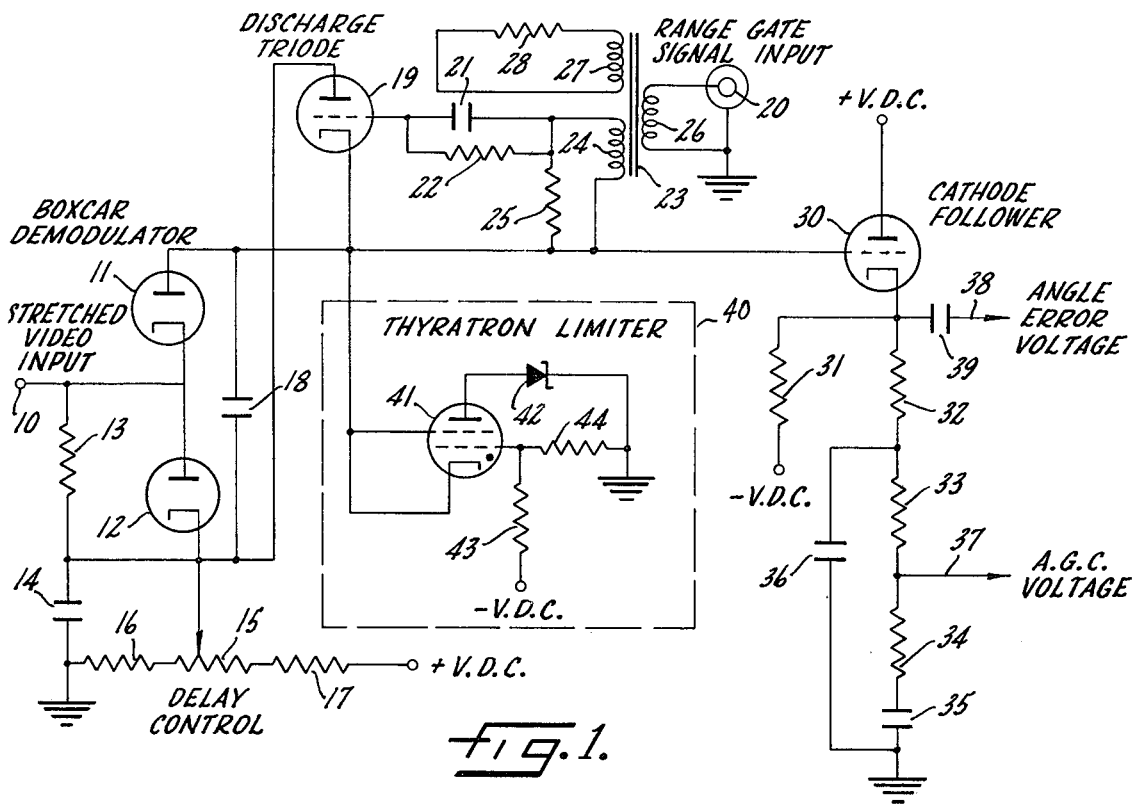
FIG. 1 illustrates in circuit schematic diagram the environment in which a thyratron limiter circuit, enclosed in dashed lines, is coupled to provide an anti-jamming angle tracking radar.
Figure 2:
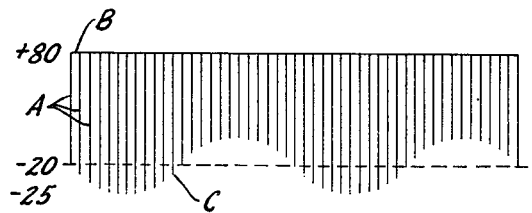
FIG. 2 illustrates a waveform of a normal amplitude modulated echo error signal of a target off the nutation axis of a conical scanning angle tracking radar.
Figure 3:
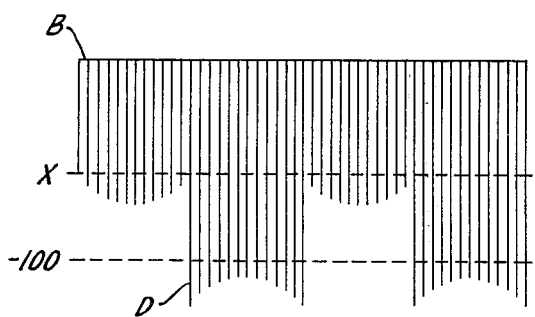
FIG. 3 illustrates a waveform envelope of the normal echo error signal of FIG. 2 with jamming signals superimposed thereon.
Figure 4:
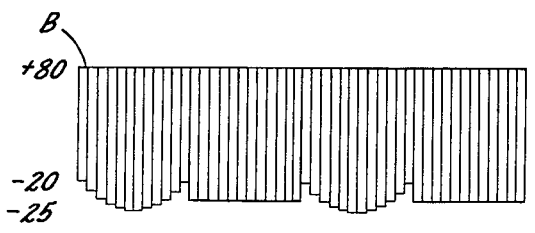
FIG. 4 illustrates the waveform envelope of the jammed RF signal of FIG. 3 with the thyratron limiter incorporated in the radar circuit.

Referring more particularly to FIG. 1, with occasional reference to FIGS. 2, 3, and 4 as they become appropriate to the description, a video input of an angle tracking radar system is adapted to be coupled to terminal 10 to apply stretched video input error signals to a detector shown herein preferably as a boxcar detector, demodulator, or generator, as it is referred to by those skilled in the art. Video input at terminal 10 may take the form of an amplitude modulated echo error signal, as shown in FIG. 2, or a jammed signal, as shown in FIG. 3. The boxcar demodulator is illustrated as having a pair of diodes 11 and 12 with the terminal 10 coupled in common to the cathode of diode 11 and anode of diode 12. While the boxcar demodulator is illustrated as having a pair of diodes 11 and 12, it is to be understood that the diodes may consist of a single double diode tube, such as a 6AL5, or the like. The cathode of the diode 11 and the anode of diode 12 are coupled through a resistance 13 and a capacitor 14 in series to a fixed potential, such as ground. The common terminal of resistance 13 and capacitor 14 is connected to the cathode of the diode 12 which cathode is coupled to the adjustable tap of a delay control potentiometer 15. The resistance element of potentiometer 15 is coupled across a positive direct current voltage source in series with resistors 16 and 17 to produce an adjustable positive direct current voltage output on the adjustable tap of the potentiometer 15. The anode of the diode 11 and the cathode of diode 12 are coupled to the opposite plates of a storage capacitor 18 to complete the boxcar demodulator circuit. This boxcar demodulator is an electrical circuit that clamps the potential of the storage capacitor 18 to the video pulse amplitude each time the pulse is received. The boxcar demodulator receiving the amplitude modulated echo error video signals, as shown by FIG. 2, on the terminal 10 would produce on the anode of diode 11, and consequently on the upper plate of the storage capacitor 18, stepped voltages which are stepped in accordance with the amplitude of each pulse as shown in FIG. 2; that is, the amplitude modulated voltage represented by the waveform of FIG. 2 would have steps along the sine wave or curve of the envelope shown.

The boxcar demodulator of radar angle tracking systems can be used only on gated systems or, at least, on systems from which an accurately timed clamping pulse is available. This is accomplished by a discharge triode 19 having the grid thereof under the control of range gate signals applied at terminal 20 from a range gate signal source in the angle tracking radar. The common coupling of the cathode of diode 12 and the lower electrode of the storage capacitor 18 is coupled directly to the anode of the discharge triode 19, and the common coupling of the anode of the diode 11 and the upper electrode of 18 is coupled directly to the cathode of the discharge triode 19. The control grid of the discharge triode 19 is coupled through a parallel network of a coupling capacitor 21 and resistor 22 to one terminal of a secondary winding 24 of a coupling transformer 23, the other terminal of the secondary winding 24 being coupled directly to the cathode of discharge triode 19. A resistor 25 is coupled in parallel with the secondary winding 24 of transformer 23. The range gate signal input 20 establishes a circuit through the primary winding 26 of the coupling transformer 23 and this coupling transformer is controlled in a damping operation of a network including a secondary 27 and a resistance 28 in circuit. The resistor 25 is of low impedance to load the secondary 24 of transformer 23 while the resistance 22 is of high impedance and used as a biasing resistor for the control grid of the discharge triode 19. The range gate signals of the angle tracking radar applied to the terminal 20 are in synchronism with the video pulses represented by A in FIG. 2 applied to the video input 10 to cause the discharge triode 19 to completely discharge the storage capacitor 18 after completion of each pulse A. This causes each pulse A to be returned to the base line B of predetermined voltage after each pulse to produce the envelope as shown in FIG. 2 with the curve C boxed in accordance with the output of the boxcar demodulator. The cathode of the discharge triode is coupled to the grid of a cathode follower tube 30, the anode of which is directly coupled to a positive direct current voltage source and the cathode of which is coupled through a cathode load resistor 31 to a negative direct current voltage source. The cathode of the cathode follower tube 30 is also coupled in series through resistors 32, 33, and 34, and in series through a capacitor 35 to the fixed potential, such as ground. Resistors 33 and 34 and the capacitor 35 have a capacitor 36 coupled in parallel therewith to provide an automatic gain control voltage output 37 from the common terminal of resistors 33 and 34. The cathode of the cathode follower tube 30 is coupled to an angle error voltage output circuit 38 through a coupling capacitor 39. While the discharge triode 19 and the cathode follower are shown and described herein as separate tubes, it is to be understood that a single twin triode may be used with similar results. The circuit above described is the boxcar demodulator circuit and cathode follower output of one illustrated type used in angle tracking radar and sets out one environment of use for which this invention may be used.

The invention consists in using a thyratron limiter circuit, as shown in the dash-lined block 40, in which a thyratron tube 41 has its cathode coupled directly to the common terminal of the anode of the boxcar demodulator diode 11 and the upper terminal plate of the storage capacitor 18. The screen grid of the thyratron tube 41 is coupled to the cathode in a manner well understood by those skilled in the art of circuiting tetrodes. The anode of the thyratron is coupled to the anode of a Zener diode 42 and the cathode of this Zener diode is coupled to the fixed potential. The control grid of the thyratron 41 is coupled to a voltage divider network consisting of resistors 43 and 44 connected between a negative direct current voltage source and the fixed potential.

OPERATION

In the operation of the device, let it be assumed for the purpose of example that the direct current voltage applied across the potentiometer 15 and its related resistors 16 and 17 is of the order of 150 volts, that the anode voltage of the cathode follower 30 is in the order of 300 volts, that the cathode voltage applied to the resistor 31 is in the order of −250 volts, and that the voltage applied to the voltage divider circuit 43, 44 is of the order of −250 volts. The potentiometer 15 may be adjusted as desired for the purpose of adjusting the delay control voltage and also the automatic gain control voltage conducted to the output 37, but let it be assumed, for the purpose of example herein, that this potentiometer is adjusted to establish approximately 80 volts of the cathode of diode 12 and the lower plate of the storage capacitor 18. In the absence of a stretched video input signal on the anode of the diode 11 and, consequently, the upper plate of storage capacitor 18, the voltage on the cathode of discharge triode 19 and on the grid of cathode follower 30 will be established at approximately 80 volts. This quiescent voltage on the anode of diode 11 can be raised or lowered by adjusting the potentiometer 15. This establishes the base line B as shown in FIGS. 2, 3, and 4 which, for the purpose of example, is 80 volts as shown. The anode of the discharge triode 19 will likewise have 80 volts thereon whereupon the range gating signals will be ineffective in producing conduction of the discharge triode 19. The boxcar demodulator circuit and the related discharge triode 19 and cathode follower 30 will be in a quiescent state under the circumstances. Upon receiving a stretched video input signal at terminal 10 as represented by the echo RF pulses A to produce the amplitude modulated envelope C showing that a target has been intercepted off the lobing axis of the angle tracking radar, the cathode voltage of diode 11 and the anode voltage of diode 12 will drop to a negative voltage which, by way of example only, is shown as −20 volts in FIGS. 2 and 4. This voltage envelope will be reproduced on the upper plate of the storage capacitor 18 to reproduce the amplitude modulated signal C with the exception that the curve C will be boxed by the boxcar demodulator in accordance with the repeated pulses A as well understood by those skilled in the art and as described, supra. Let it further be assumed for the purpose of example, that the voltage divider circuit 43, 44 establishes a negative 100 volts on the control grid of the thyratron 41. With this negative grid bias on the thyratron 41, the amplitude modulated signal illustrated in FIG. 2 on the upper plate of the storage capacitor 18 will not be limited or affected in any way and will be conducted directly to the grid of the cathode follower tube 30 which will be reproduced on the output 38 as the angle tracking error voltage for the angle tracking circuits of own radar. The moment that enemy radar returns jamming signals, represented by D in FIG. 3, to apply the voltage envelope represented in FIG. 3 to the stretched video terminal 10, the boxcar detector circuit will detect these voltage jamming signals which, without the thyratron limiter circuit 40, will be effective through the cathode follower tube and on the output 38 to produce erroneous tracking in the angle tracking circuits. These jamming signals are always of greater amplitude than −100 volts to insure range gate stealing and as soon as such jamming signals as D appear, the cathode voltage of the thyratron 41 will become negative with respect to its control grid voltage and thyratron 41 will fire and immediately discharge the storage capacitor 18 to a voltage equal to the voltage drop across the thyratron 41 and the Zener diode 42. The voltage level illustrated by the character X will vary in accordance with the jamming signal-to-normal signal ratio. The thyratron 41 and the Zener diode 42 can readily be picked to have approximately a 13 volt drop and a 12 volt drop, respectively, for this example to produce a voltage drop of 25 volts which would limit the negative voltage on the upper electrode of storage capacitor 18 to −25 volts. Thus, there is established on the upper electrode of capacitor 18 a voltage wave pattern as shown by FIG. 4 wherein the jamming signals D shown in FIG. 3 would be clipped to eliminate the effects of these jamming signals on the control grid of the cathode follower tube 30. While one-half of each cycle of error signal voltage is eliminated and rendered ineffective for the angle tracking circuits, the remaining one-half of each cycle of the error signal voltage is effective in the angle tracking circuits so that angle tracking may be maintained although jamming signals will be received by the angle tracking radar. The thyratron limiter therefore renders ineffective the jamming signals of an enemy inverse gain jamming radar and enables own radar to continue in its angle tracking operation.

While many modifications and changes may be made in the constructional details of the thyratron limiter and while this thyratron limiter may be utilized for limiting the amplitude of voltage signals in other than boxcar demodulator circuit environments as disclosed herein, it is to be understood that we desire to be limited only in the scope of the appended claims. It is to be further understood that the voltage suggested for the various terminal points of the circuit to provide an operable example may be changed to meet other applications and that these voltages are not intended to in any way limit the scope of this invention.

We claim:

1. A limiter circuit for limiting the voltage amplitude of a circuit comprising:
    a circuit to be limited with respect to a fixed potential thereof;
    an electron emission device having a control electrode and two conduction electrodes, one of said conduction electrodes being coupled to said circuit to be limited and the other of said conduction electrodes being coupled to said fixed potential;
    a Zener diode having its anode connected to said other conduction electrode of said electron emission device and its cathode coupled to said fixed potential; and
    a voltage biasing source from said fixed potential connected to said control electrode of said electron emission device to establish a voltage amplitude limit for said circuit to be limited.

2. A limiter as set forth in claim 1 wherein said biasing source is from a point in a voltage divider circuit coupled between a voltage source and said fixed potential.

3. A limiter circuit for limiting the voltage amplitude of a detector circuit comprising:
    a thyratron having a cathode coupled to said detector circuit, an anode, and a control grid;
    a diode serially connected between said thyratron anode and a fixed potential; and
    a biasing source from said fixed potential coupled to said thyratron grid to establish a voltage amplitude limit on said cathode at which time said thyratron will change from nonconduction to conduction whereby said detector circuit will be limited in voltage amplitude at the conduction level of said thyratron.

4. A limiter circuit as set forth in claim 3 wherein said diode is a Zener diode with the anode thereof coupled to the anode of said thyratron and its cathode coupled to said fixed potential.

5. A limiter circuit as set forth in claim 4 wherein said biasing source is a voltage divider circuit coupled across a direct current voltage one terminal of which is said fixed potential with a contact on the divider coupled to said thyratron grid to establish the biasing voltage.

6. A thyratron limiter for limiting the error voltage of a conical scanning target tracking radar to eliminate jam signals comprising:
    a thyratron having a cathode coupled to the detector circuit of a tracking radar, an anode, and a control grid;
    a Zener diode having an anode coupled to the anode of said thyratron and a cathode coupled to a fixed voltage; and
    a voltage divider coupled across a voltage source and said fixed voltage, said voltage divider having a contact therein coupled to the control grid of said thyratron to establish a voltage bias thereon and a voltage level at which said thyratron will conduct, said conduction being maintained until the voltage drop across said thyratron and Zener diode is reached whereby the voltage amplitude of error voltage signals in said radar detector circuit will be limited to eliminate jam signals.

* * * * *